Sept. 1, 1925.
T. BROWN
PLOW
Filed Aug. 16, 1919
1,551,535
2 Sheets-Sheet 1
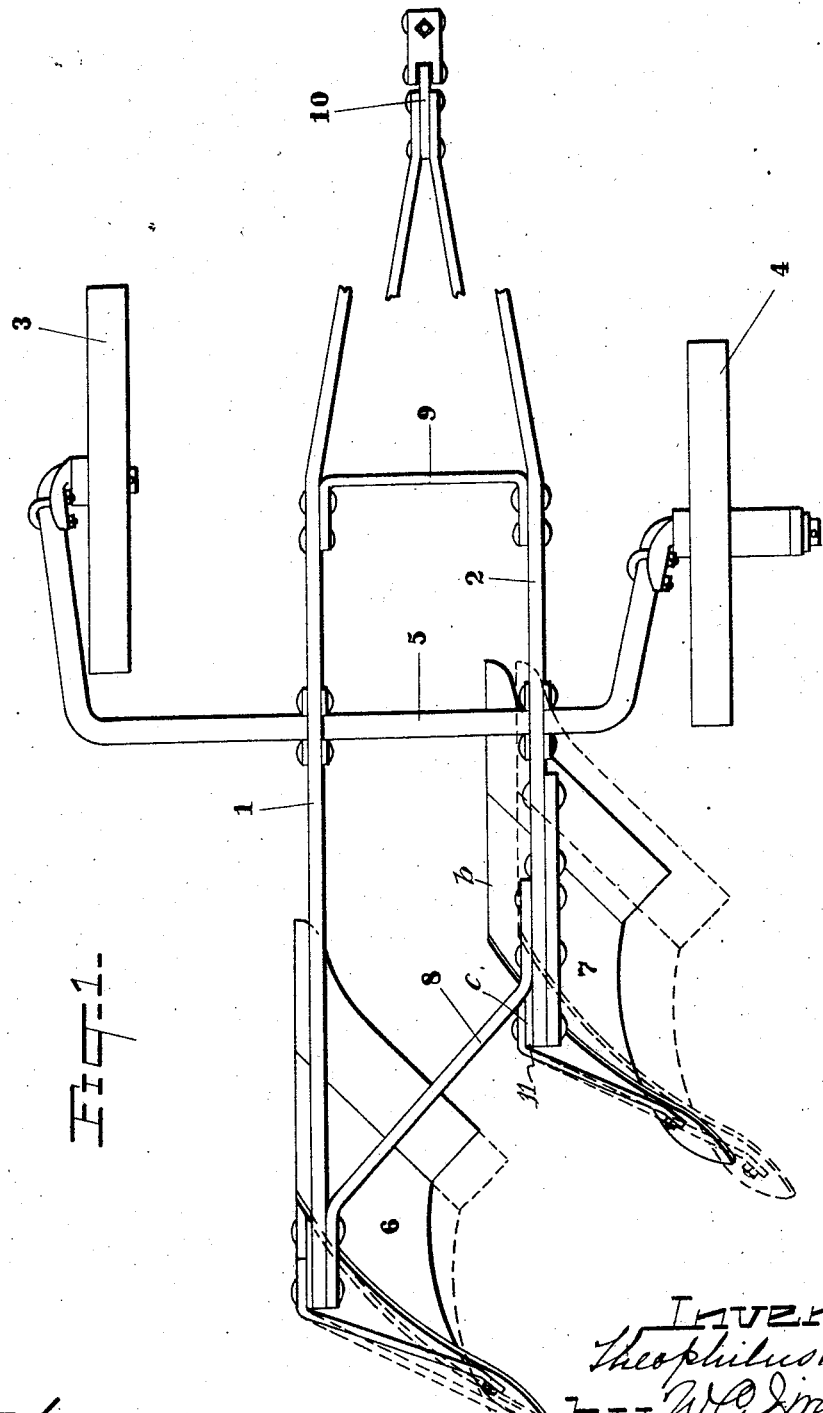

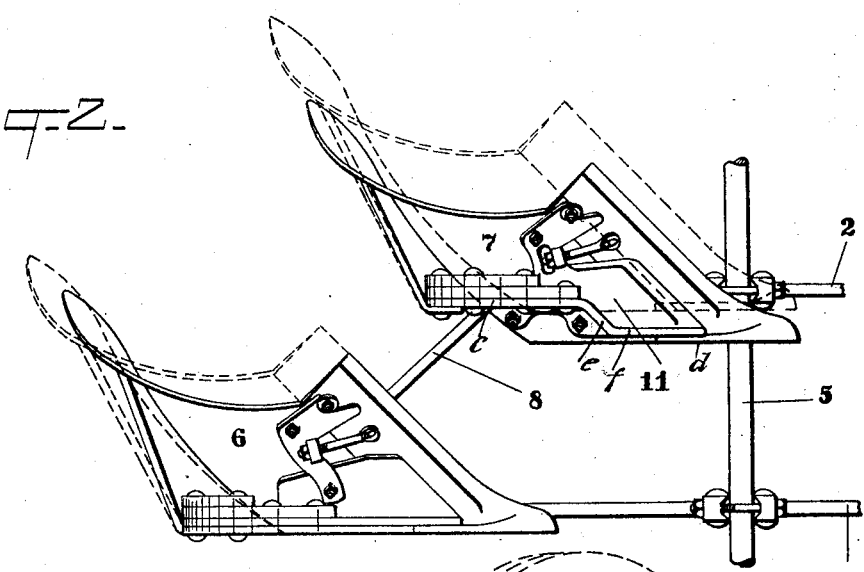
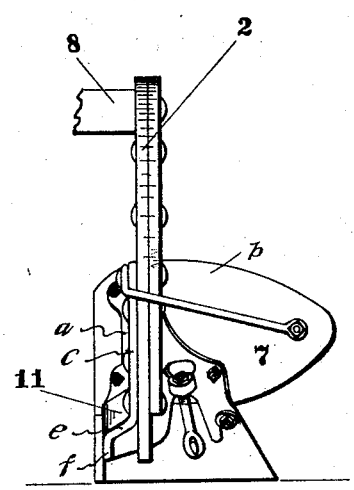
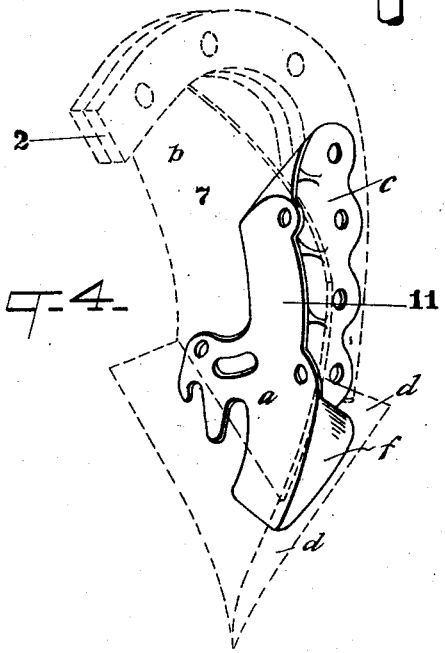

Patented Sept. 1, 1925.

1,551,535

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

PLOW.

Application filed August 16, 1919. Serial No. 318,062.

*To all whom it may concern:*

Be it known that I, THEOPHILUS BROWN, a citizen of the United States, residing at Moline, in the county of Rock Island and State of Illinois, have invented certain new and useful Improvements in Plows, of which the following is a specification, reference being had therein to the accompanying drawing.

My invention relates to plows, and more particularly to that type in which a plurality of plow bodies is employed, and the object of my invention is to provide in a plow of this class, having plow beams secured apart a fixed distance, means by which a plow of different size can be secured to the beams in such a manner as to narrow the cut of the plow, this means comprising a frog with a part, to which the moldboard is secured, extended laterally, as will be fully described in the following specification.

Referring to the drawings in which similar numerals indicate identical parts—

Figure 1 is a plan view of a plow showing sufficient of the structure to illustrate my invention.

Figure 2 is a bottom plan view of part of Figure 1 embodying my invention.

Figure 3 is a rear view of one of the plow beams having my improvement thereon, and Figure 4 is a perspective view of my improved frog.

The plow beams 1 and 2 are pivotally supported on an axle, having ground wheels 3 and 4, and a central portion bent to form a bail 5 by a rocking movement of which the plow beams 1 and 2 and plows 6 and 7 are raised and lowered. The beams 1 and 2 are spaced apart and rigidly connected by braces 8 and 9 and have their forward ends convergent to a desired type of draft device to which they are rigidly secured.

In Figure 1 the usual size of the plow employed in a structure of this kind is indicated in dotted lines, and a smaller type of plow in full lines, my improvement being utilized in order that the smaller plow may be carried on the same beam structure as the larger plow without altering the position of the beams relative to each other, and this I accomplish by providing a frog 11, of greater lateral dimension than the ordinary type of frog, so that where it is mounted on the beam 2 the plow body 7 secured thereon will extend landwardly a sufficient distance to be in proper line with the furrowward end of the plow body 6, the latter being mounted on the beam 1 with a frog of the ordinary type. As stated the frog 11 is of greater lateral dimension than the ordinary type of frog, in that the face part *a* thereof, to which the moldboard *b* is bolted, is broadened in a landward direction with a single curved surface and is provided with suitable bolt holes; the part *c* of the frog 11 is also provided with suitable bolt holes through which bolts are passed to secure the frog to a beam or standard. The lower portion of the part *a* of the frog 11 preferably extends landward farther than the upper portion thereof, and the part *c* is extended at *e* across the rear of the lower portion of the part *a* and then follows the landward edge of the part *a* at *f* so as to contact snugly with a landside *d* of a plow, as shown more clearly in Figure 3. The face part *a* of the frog 11 has the usual furrowward extension which in this instance is a quick detachable device, to which I do not limit myself, as a means of securing the moldboard in proper position. The frog is marketable as a new article of manufacture being adapted for use on various types of plows having a plurality of plow bodies.

What I claim is—

1. A plow, having in combination, a plurality of plow beams spaced apart a fixed distance, a plow body mounted on each beam, each plow body including a frog, the frog of one of said bodies having a landwardly extended face whereby the plow body is carried landwardly beyond its beam a greater distance than the adjacent plow body from the adjacent beam.

2. A plow, having in combination, a plurality of plow beams spaced a fixed distance apart, a plow body mounted on each beam, each plow body including a frog having a rearward part adapted to be secured to the beam and a face on which the moldboard is mounted, the frog of one of said plow bodies having the face thereof extended landwardly whereby the plow body is carried landwardly beyond its beam a greater distance than the adjacent plow body from the adjacent beam.

3. A plow, having in combination, a plurality of plow beams spaced a fixed distance apart, a plow body mounted on each beam, each plow body including a frog, the frog of one of said bodies extended laterally beyond the beam to which it is connected toward the adjacent plow whereby the distance between the plow body of which said frog forms a part and the adjacent plow body is decreased irrespective of the distance between the beams.

THEOPHILUS BROWN.